United States Patent
Bleckmann et al.

(10) Patent No.: US 6,202,017 B1
(45) Date of Patent: Mar. 13, 2001

(54) CIRCUIT CONFIGURATION FOR CONTROLLING ELECTRIC OR ELECTROMECHANICAL CONSUMERS

(75) Inventors: Hans Wilhelm Bleckmann, Bad Nauheim; Heinz Loreck, Idstein; Michael Zydek, Frankfurt am Main; Wolfgang Fey, Worrstadt; Peter Jones, Neu Isenburg, all of (DE)

(73) Assignee: Continental Teves AG & Co. oHG, Frankfurt am Main (DE)

( * ) Notice: Subject to any disclaimer, the term of this patent is extended or adjusted under 35 U.S.C. 154(b) by 0 days.

(21) Appl. No.: 07/989,027

(22) PCT Filed: Aug. 9, 1991

(86) PCT No.: PCT/EP91/01516

§ 371 Date: Jul. 15, 1993

§ 102(e) Date: Jul. 15, 1993

(87) PCT Pub. No.: WO92/04217

PCT Pub. Date: Mar. 19, 1992

(30) Foreign Application Priority Data

Sep. 12, 1990 (DE) ................................ 40 28 926

(51) Int. Cl.[7] .................................................. G06F 9/30
(52) U.S. Cl. ..................................... 701/70; 703/1; 703/8
(58) Field of Search .................. 364/424.01, 424.05, 364/431.06, 424.03, 431.11, 431.05, 131, 133; 340/825.06, 825.07, 825.08

(56) References Cited

U.S. PATENT DOCUMENTS

| 4,255,789 | * | 3/1981 | Hartford et al. ........................ 364/424 |
| 4,347,563 | * | 8/1982 | Paredes et al. ......................... 364/137 |
| 4,546,437 |   | 10/1985 | Bleckmann et al. .................. 364/426 |
| 4,894,781 | * | 1/1990 | Sato et al. ......................... 364/431.11 |
| 4,926,332 | * | 5/1990 | Komuro et al. ................. 364/424.05 |
| 4,933,862 | * | 6/1990 | Wataya ............................. 364/431.06 |
| 4,991,101 | * | 2/1991 | Ishikawa .......................... 364/431.05 |
| 5,189,617 | * | 2/1993 | Shiraishi ......................... 364/424.05 |
| 5,327,343 | * | 7/1994 | Forchert et al. ................. 363/424.01 |

FOREIGN PATENT DOCUMENTS

| 3136944 | 3/1983 | (DE) . |
| 3234637 | 3/1984 | (DE) . |
| 3447449 | 7/1985 | (DE) . |
| 0133381 | 2/1985 | (EP) . |
| 2377308 | 8/1978 | (FR) . |

OTHER PUBLICATIONS

Kamal Majeed, "Dual Processor Automotive Controller," IEEE, 1988, pp. 39–44.*

* cited by examiner

*Primary Examiner*—Kevin J. Teska
*Assistant Examiner*—T. Phan
(74) *Attorney, Agent, or Firm*—Ratner & Prestia

(57) ABSTRACT

A circuit configuration for controlling a major number of consumers (5) such as the electromagnetically operable multi-directional valves of an anti-lock control system (MWV1–MWVn) comprises a control unit (2, 3) whose output signals can be fed to the consumers (5) via amplifier stages (4). The individual amplifier stages (4; VS1–VSn) are designed as so-called "intelligent power drivers" and essentially consist of a power amplifier (18) with integrated electronic controls and monitors. The control unit (2, 3) and the amplifier stages (4; VS1–VSn) are interconnected to form a closed loop or chain. Data transfer is performed from a synchronous serial interface of the control unit (2, 3), via the individual amplifier stages (4; VS1–VSn) and back to a serial entry of the control unit (2, 3).

13 Claims, 2 Drawing Sheets

US 6,202,017 B1

CIRCUIT CONFIGURATION FOR CONTROLLING ELECTRIC OR ELECTROMECHANICAL CONSUMERS

FIELD OF THE INVENTION

This invention relates to a circuit configuration for controlling a major number of electric or electromechanical consumers such as the electrically driven hydraulic pumps, the electromagnetically operable multi-directional valves etc. of an automotive vehicle control system where the control signals are generated by means of a control unit, such as a microprocessor or microcomputer, and can be delivered to the consumers via amplifier stages. Such control circuits are needed for anti-lock control systems, traction slip control systems and for suspension control systems.

BACKGROUND OF THE INVENTION

German Published Patent Application (DE-OS) No. 32 34 637 discloses a circuit configuration of this type for controlling an anti-lock-controlled brake system. Microprocessors or microcontrollers serve to derive braking pressure control signals from sensor signals containing the required information. To this end, via amplifier stages, the output signals of the microprocessors are delivered to electromagnetically operable valves influencing the pressure medium flow and, hence, the braking pressure.

Eight and more multi-directional valves are needed for known systems of this type. The appertaining valve drivers or amplifier stages are actuated in parallel by the microcomputer via an interface module or via discrete electronic systems. This implies a considerable amount of wiring, all the more so since there are additional actuating and feedback lines in each case.

SUMMARY OF THE INVENTION

It is now an object of this invention to reduce considerably this amount of wiring, the required pins and required interfaces, in particular at the integrated circuits, and thus to reduce considerably the cost of manufacture of such a circuitry.

This object can be solved by a circuit configuration of the present invention, wherein the amplifier stages are designed as so-called "intelligent" power drivers and essentially consist of a power amplifier with integrated electronic controls and monitors. The amplifier stages of the present invention are interconnected as well as, via a synchronous serial interface, connected to the control unit so that a data transfer flows in a closed loop or chain from the control unit, via the amplifier stages and back to a serial entry of the control unit, for controlling the data transfer connections of an operating cycle and an activation instruction or a transfer instruction.

According to this invention, the described disadvantages of known circuit configurations of this type are overcome. The amount of manufacturing cost is reduced by means of the special design of the power ICs and by a serial data transfer via the amplifier stages interconnected to form a closed loop. Data are transferred back to a serial entry of the control unit via this loop. The comparison of the serial output signals of the control unit with the input signals of this control unit allows conclusions with regard to proper operation of all the circuits.

According to a preferred embodiment of this invention, the amplifier stages for receiving and transferring the data to the following amplifier stages or back to the control unit are equipped with shift registers. In this embodiment, each of the amplifier stages are assigned a position in the serial data word by means of which data transfer takes place from the control unit via the closed loop formed by the amplifier stages.

A further example of an embodiment of this invention consists in that each of the amplifier stages is equipped with a nominal value memory. In this embodiment, after data transfer into the shift registers, the instructions stored in the shift register are transferrable into the nominal value memory by means of a common transfer instruction and are implementable by means of corresponding actuation of the power amplifiers. Further, it is suggested to equip each of the amplifier stages with an actual value memory to which the level at the outlet of the power amplifier can be fed as actual value via a voltage monitoring circuit. Also, it is suggested to rate the circuit configuration such as to ensure that, by means of the common transfer instruction, the actual values are transferrable into the shift registers and get back from the same to the control unit during data transfer in the closed loop. Evaluation of the actual values permits the existence of any defects to be directly detected.

Finally, according to this invention, it is provided to accommodate one, two or three complete amplifier stages in one integrated circuit at a time.

Further characteristics, advantages and applications of this invention will become evident from the following description of an example of an embodiment, reference being made to the accompanying drawings.

DETAILED DESCRIPTION OF THE DRAWINGS

Figure 1:
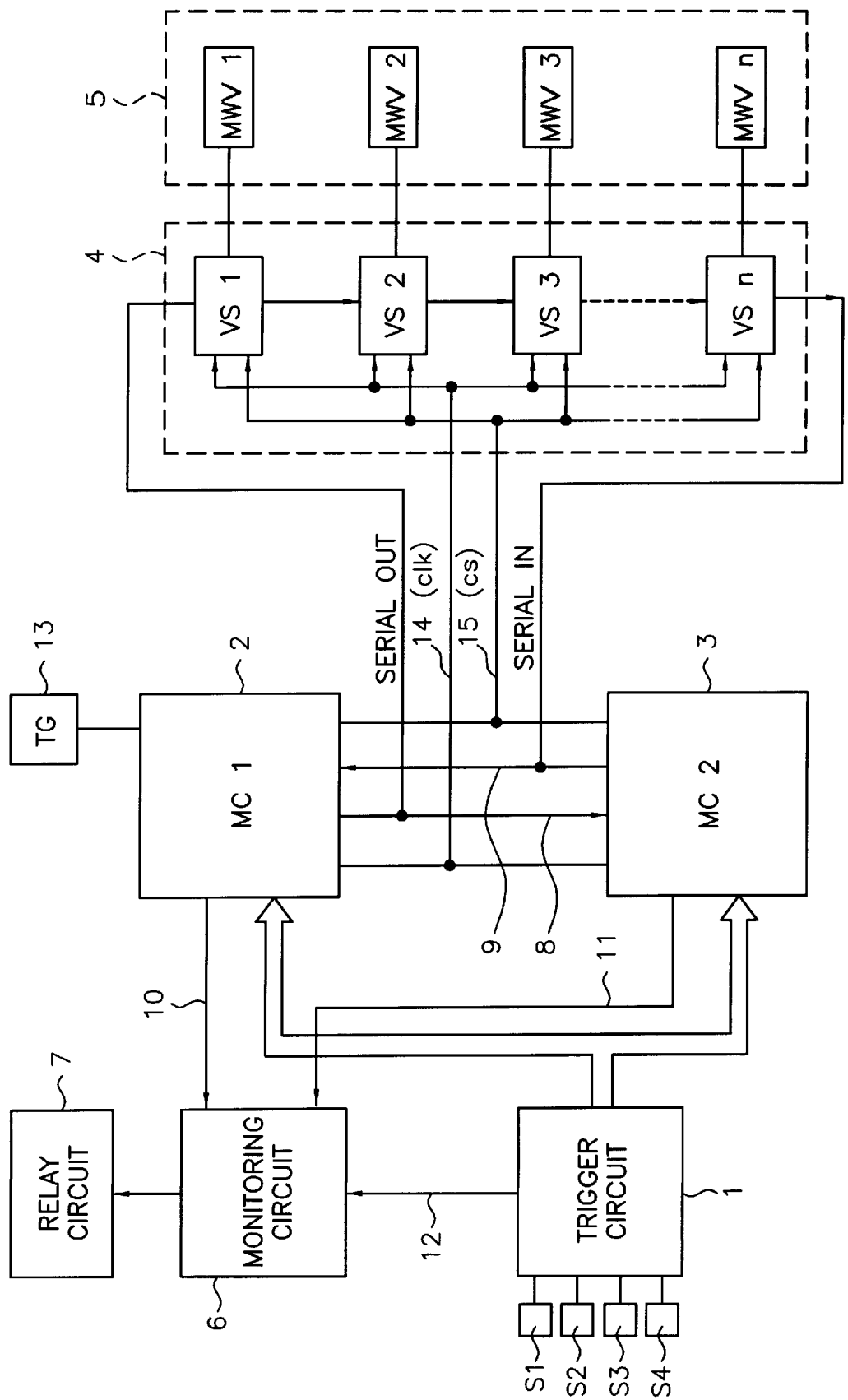
FIG. 1 shows the principles of the structure and the essential assemblies of a circuit configuration according to this invention.

The circuit configuration of FIG. 1 forms part of an electronic anti-lock control system. It serves for evaluating the information which wheel sensors S1–S4 have obtained on the rotational behavior of the individual vehicle wheels and for generating braking pressure control signals by means of which electromagnetically operable multi-directional valves MWV1–MWVn are actuated. As is known, by means of these valves, the braking pressure in the wheel brakes is controlled or regulated in dependence on the rotational behavior of the wheels. Thus, it is possible to prevent the wheels from locking while, nevertheless, maintaining a braking pressure as high as possible in order to achieve an effective braking operation with a short stopping distance.

The essential components of the illustrated circuit configuration are a trigger circuit 1, where the output signals of the wheel sensors S1–S4 are handled and converted, and two microcomputers 2, 3 for generating braking pressure control signals. These signals are fed to amplifier stages VS1–VSn which, as a whole, are referred to by reference numeral 4. The amplifier stages, in dependence on the output signals of the microcomputers 2, 3, generate actuating signals for the multi-directional valves MWV1–MWVn combined into a block 5. Moreover, a monitoring circuit 6 is provided which, by means of a relay circuit 7 or the like, will interrupt power supply if a malfunction is detected, thus cutting off anti-lock control. Thereby, in a manner known, it is ensured even in case of defects in the electronic system that the brake will go on operating, if uncontrolled.

In the illustrated example of an embodiment of the present invention, the sensor signals handled in the trigger circuit 1 are processed and evaluated in the same way in the two microcomputers 2, 3. The data are permanently exchanged between the two microcomputers 2, 3 via signal lines 8, 9 and are checked for consistency. If they are not consistent this will be communicated to the monitoring circuit 6 via lines 10 and 11, said monitoring circuit 6 thereupon activating cutoff of control via stage 7. Even a defect in trigger circuit 1 will be communicated to the alarm circuit via line 12 and will cause cutoff of control.

Moreover, a clock generator 13 is represented, delivering the operating cycle of the microcomputers 2, 3 and, via line 14, to the amplifier stages 4.

Essential for this invention is the design and actuation of the individual amplifier stages VS1–VSn. These amplifier stages namely are designed as so-called "intelligent power drivers" and, on principle, consist of a power amplifier with integrated electronic controls and monitors. One sole chip, or rather one integrated circuit, accommodates one, two or three power amplifiers of this type at a time. The number of the required amplifier stages, or rather of the required chips, is determined by the number of the consumers connected. In FIG. 1, only the electromagnetically operable multidirectional valves of an anti-lock control system are represented as consumers. However, it is also possible, for instance, to actuate the hydraulic pump of an anti-lock control system or of a suspension control system or even other consumers via these amplifier stages. The individual amplifier stages VS1–VSn of block 4 are connected in series with regard to data transfer and connected to a serial outlet of the microcomputer 2 (3) or, to put it in more general terms, are linked with the microcomputer 2 (3) via a synchronous serial interface. Data transfer is performed in the form of a closed loop or chain. The last link of this chain, the outlet of amplifier stage VSn, is led back to a serial entry of the microcomputer 2(3).

Information in the form of data words is available at the serial outlet of microcomputer 2(3). The assignment of the individual amplifier stages is selected so as to ensure that each of the amplifier stages VS1–VSn is assigned a position in the serial data word by means of which data transfer is performed from the microcomputers to the amplifier stages.

The individual amplifier stages contain shift registers 16 (see FIG. 2) which receive and transfer the signals in the operating cycle clk. As the loop is a closed loop, with the following transfer of a data word, the data are shifted back into the control unit, in this case, the microcomputer 2 (3).

As stated, the individual amplifiers are serially connected into the data flow. Moreover, they are connected in parallel to the operating cycle or clk via a line 14 and are connected in parallel to a line 15 supplying a common transfer instruction. After the data have been written into the shift registers of the individual amplifier stages by means of a common instruction via line 15, the respective signal is transferred into a nominal value memory 17 of the amplifier stages, and the instruction is carried out by means of corresponding actuation of the consumers 5. This will subsequently be explained in more detail with reference to FIG. 2.

Figure 2:
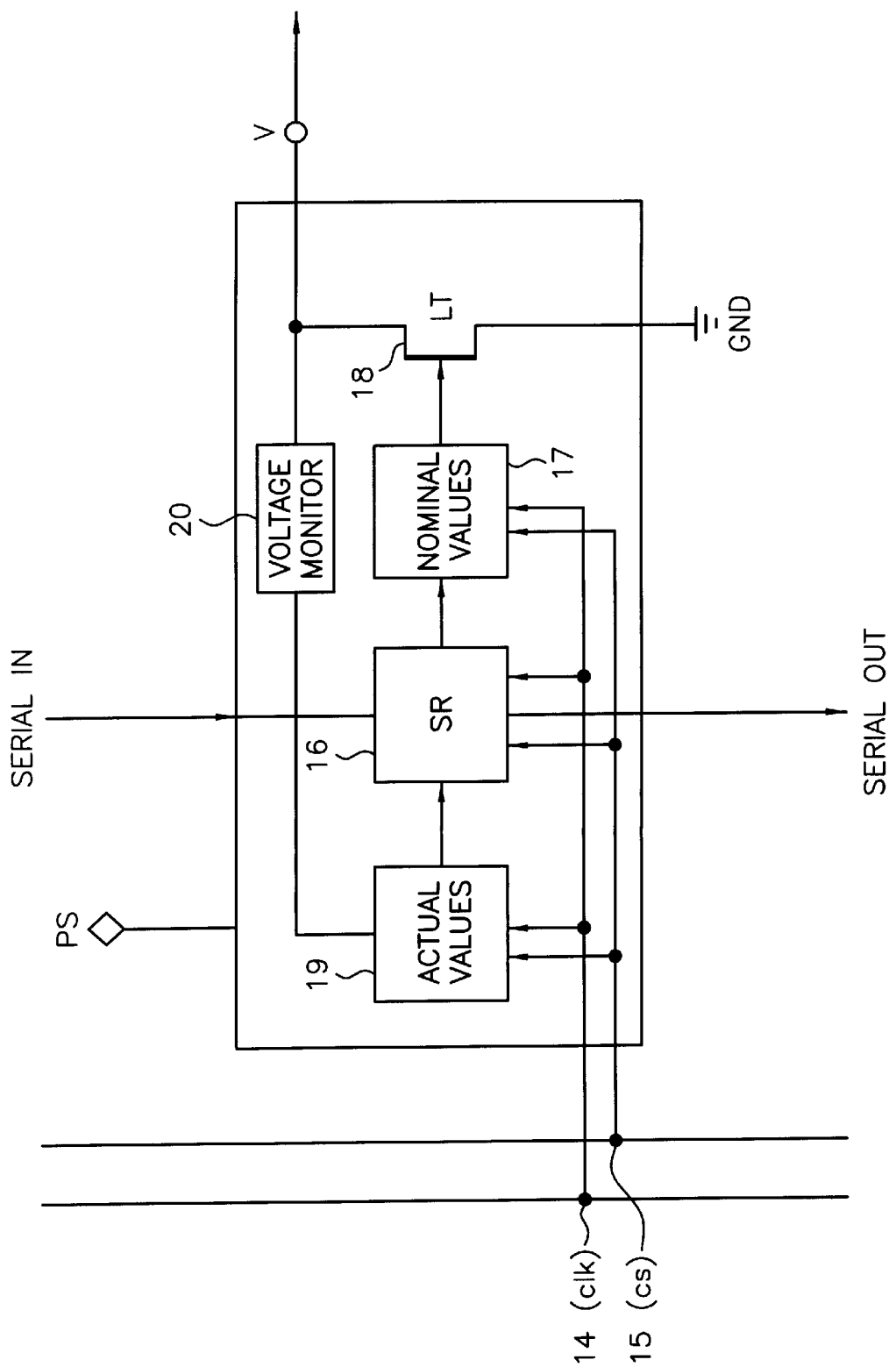
FIG. 2, in a block diagram, shows the principles of the structure of an example of an embodiment of an amplifier stage of the circuit configuration according to FIG. 1.

FIG. 2 serves to illustrate the mode of operation of the individual amplifier stages VS1–VSn. As already explained, each amplifier stage contains a shift register 16. By means of the transfer instruction, the contents of this shift register are transferred into a nominal value memory 17 which by actuating a power transistor 18 directly carries out the instruction, with the power transistor 18 on its part being connected with the consumer such as a solenoid valve via a connection V. Moreover, each of the amplifier stages contains an actual value memory 19 which, after the instructions have been carried out, registers the actual state of the power transistor 18 by means of a voltage monitoring circuit 20 and transfers the same into the shift register 16 with the next storage pulse. As a consequence, during the following data transfer, the actual value will be transferred to the following shift register and finally back to the control unit, namely to the microcomputer 2 (3). By comparing the original instruction and this actual value, it is possible to detect malfunctions during signal evaluation. The transfer of the actual value into the shift register 16 and the transfer of this value into the serial data path and back into the control unit, or rather to the microcomputer 2 (3), consequently represents a particularly simple and effective way of monitoring the electronic system.

The inventive circuit configuration has many advantages as compared with the already described known circuit configurations with parallel actuation of the individual amplifier stages. The reduced amount of wiring proves to be a great advantage both in case of a compact structure of a complete control unit and in case of peripheral accommodation of the individual components. It is absolutely possible to accommodate the individual amplifiers, connected in series, at a large distance with regard to one another. The closed serial loop permits reliable monitoring. Therefore a system provided with such a circuit configuration is especially reliable in its operation. It is possible to connect whatever number of amplifier stages in series which will be sufficient for any cases coming up in practice.

What is claimed is:

1. A circuit configuration for controlling a major number of electric or electromechanical consumers of an automotive vehicle control system where control signals generated by an electronic control unit responsive to sensing signals can be delivered to the consumers via amplifier stages, wherein the amplifier stages are designed as "intelligent power drivers" comprising a power amplifier with integrated electronic controls and status monitors for producing status signals, and the amplifier stages are interconnected and connected to the control unit via a synchronous serial interface, wherein a data transfer flows in a closed loop or chain from a serial exit of the control unit via the amplifier stages and back to a serial entry of the control unit, and comprises the control signals delivered to the amplifier stages and status signals returned from the amplifier stages, and wherein the circuit configuration provides for an operating cycle and for an activation instruction or a transfer instruction for controlling connections of the data transfer through the closed loop or chain between the amplifier stages and control unit.

2. A circuit configuration as claimed in claim 1, wherein each of the amplifier stages, for receiving and transferring data to the following amplifier stage or back to the control unit, are equipped with shift registers and each of the amplifier stages is assigned a position in a serial data word by means of which data transfer takes place from the control unit via the closed loop formed by the amplifier stages.

3. A circuit configuration as claimed in claim 2, wherein each of the amplifier stages is equipped with a nominal value memory and, after data transfer is effected into the shift registers to form shift register instructions, the shift register instructions stored in the shift register are transferrable into the nominal value memory by means of a transfer instruction which all amplifier stages have in common and are implementable by means of corresponding actuation of the power amplifiers.

4. A circuit configuration as claimed in claim 3, wherein each of the amplifier stages is equipped with an actual value memory to which the level at the outlet of the power amplifier can be fed as actual value via a voltage monitoring circuit and, by means of the common transfer instruction, the actual values are transferrable into the shift registers and are returned from the shift registers to the control unit during data transfer in the closed loop.

5. A circuit configuration as claimed in claim 4, wherein one, two or three complete amplifier stages are accommodated in one integrated circuit at a time.

6. A circuit configuration for controlling components of a control system of an automotive vehicle, said circuit configuration comprising:
   means for sensing the rotational behavior of a plurality of wheels of an automotive vehicle and for generating a plurality of wheel behavior signals representative of the rotational behavior of said wheels;
   a control unit responsive to said plurality of wheel behavior signals for: (1) evaluating said wheel behavior signals, (2) developing a plurality of braking pressure control signals, and (3) arranging said braking pressure control signals in a predetermined sequence;
   a plurality of series connected driver units:
      (a) to which said braking pressure control signals are supplied, the first of the series of said driver units and the last of said series of said driver units connected to said control unit, and
      (b) means for generating status signals indicating output values of said driver units;
   a plurality of components individually coupled to said driver units and individually responsive to said braking pressure control signals; and means for controlling transfer of:
      (a) said braking pressure control signals delivered from said control unit to said driver units,
      (b) said status signals delivered from said driver units to said control unit, and
      (c) said braking pressure control signals from the driver units to said components in a closed loop or chain from a serial exit of said control unit through said driver units and back to a serial entry of said control unit through said driver units.

7. A circuit configuration of claim 6, wherein said control unit includes:
   (a) first and second microcomputers individually responsive to said plurality of wheel behavior signals for: (1) evaluating said wheel behavior signals, (2) developing identical first and second pluralities of braking pressure control signals, and (3) arranging said braking pressure control signals in a predetermined sequence,
   (b) means extending between said first and said second microcomputers for exchanging data represented by said braking pressure control signals between said first and said second microcomputers to check the consistency of the exchanged data, and
   (c) means for detecting malfunctions and inconsistency of the data exchanged between said first and said second microcomputers and for developing cut-off signals upon detection of malfunctions and inconsistency of exchanged data.

8. A circuit configuration of claim 6, wherein each of said driver units includes a power amplifier having an outlet level.

9. A circuit configuration of claim 8, wherein each of said driver units further includes a shift register, responsive to:
   (a) said means for controlling the flow of data through said series connected driver units,
   (b) said means for controlling the transfer of said braking pressure control signals from said driver units to said components, and
   (c) said braking pressure control signals, for receiving and transferring data,
and wherein said driver units are aligned in series in a predetermined sequence corresponding to said predetermined sequence of said braking pressure control signals.

10. A circuit configuration of claim 9, wherein each of said driver units further includes a nominal value memory, responsive to:
   (a) said means for controlling the flow of data through said series connected driver units,
   (b) said means for controlling the transfer of said braking pressure control signals from said driver units to said components, and
   (c) said braking pressure control signals received by said shift register,
for storing data represented by said braking pressure control signals and for conducting said data to said power amplifier.

11. A circuit configuration of claim 10, wherein each of said driver units further includes:
   a voltage monitoring circuit, responsive to said power amplifier, for monitoring said outlet level of said power amplifier; and
   an actual value memory, responsive to:
      (a) said means for controlling the flow of data through said series connected driver units,
      (b) said means for controlling the transfer of said braking pressure control signals from said driver units to said components, and
      (c) said voltage monitoring circuit,
for storing and transferring the outlet level of said power amplifier to said shift register.

12. A circuit configuration of claim 6, wherein three of said driver units are accommodated in a single integrated circuit.

13. A circuit configuration for controlling components of a control system of an automotive vehicle, said circuit configuration comprising:
   means for sensing the rotational behavior of a plurality of wheels of an automotive vehicle and for generating a plurality of wheel behavior signals representative of the rotational behavior of said wheels;
   a control unit including:
      (a) first and second microcomputers individually responsive to said plurality of wheel behavior signals for: (1) evaluating said wheel behavior signals, (2) developing identical first and second pluralities of braking pressure control signals, and (3) arranging said braking pressure control signals in a predetermined sequence,
      (b) means extending between said first and said second microcomputers for exchanging data represented by said braking pressure control signals between said first and said second microcomputers to check the consistency of the exchanged data, and
      (c) means for detecting malfunctions and inconsistency of the data exchanged between said first and said second microcomputers and for developing cut-off signals upon detection of malfunctions and inconsistency of exchanged data;

a plurality of series connected driver units:
  (a) to which said braking pressure control signals are supplied, the first of the series of said driver units connected to an output from said first microcomputer and an input to said second microcomputer and the last of said series of said driver units connected to an input to said first microcomputer and an input to said second microcomputer, and
  (b) means for generating status signals indicating output values of said driver units;
a plurality of components individually coupled to said driver units and individually responsive to said braking pressure control signals; and
means for controlling transfer of:
  (a) said braking pressure control signals delivered from said control unit to said driver units,
  (b) said status signals delivered from said driver units to said control unit, and
  (c) said braking pressure control signals from the driver units to said components
in a closed loop or chain from a serial exit of said first microcomputer through said driver units and back to a serial entry of said first and second microcomputers through said driver units.

* * * * *

UNITED STATES PATENT AND TRADEMARK OFFICE
CERTIFICATE OF CORRECTION

PATENT NO. : 6,202,017 B1
DATED : March 13, 2001
INVENTOR(S) : Bleckmann et al.

It is certified that error appears in the above-identified patent and that said Letters Patent is hereby corrected as shown below:

Column 5,
Line 36, of the Letters Patent, "means..." should start a new paragraph.
Line 42, of the Letters Patent, "in..." should start a new paragraph.

Column 6,
Line 8, of the Letters Patent, "for..." should start a new paragraph.

Signed and Sealed this

Thirtieth Day of October, 2001

Attest:

NICHOLAS P. GODICI
Attesting Officer  Acting Director of the United States Patent and Trademark Office